United States Patent

[11] 3,618,729

| [72] | Inventors | William Edwin Ely;<br>Ralph R. Main, both of Troy, Ohio |
|---|---|---|
| [21] | Appl. No. | 852,542 |
| [22] | Filed | Aug. 25, 1969 |
| [45] | Patented | Nov. 9, 1971 |
| [73] | Assignee | The B. F. Goodrich Company<br>New York, N.Y. |

[54] SEGMENTED FRICTION MEMBER FOR BRAKE OR CLUTCH
5 Claims, 7 Drawing Figs.

[52] U.S. Cl. .................................................. 192/107 R,
188/218 XL, 188/264 CC
[51] Int. Cl. ............................................... F16d 13/64
[50] Field of Search ........................................... 192/107;
188/264 CC, 218

[56] References Cited
UNITED STATES PATENTS

| 3,403,759 | 10/1968 | Holcomb | 192/107 X |
| 3,452,844 | 7/1969 | Lallemant | 192/107 X |
| 3,473,635 | 10/1969 | Krause | 192/107 X |
| 3,478,850 | 11/1969 | Abu-Akeel | 188/218 |
| 3,483,953 | 12/1969 | Bender | 192/107 X |

*Primary Examiner*—Benjamin W. Wyche
*Attorneys*—John D. Haney and Harold S. Meyer ABSTRACT: A brake or clutch mechanism that has an annular stator or rotor composed of a plurality of connected individual segments. Each segment has a plate member of heat-absorbing material sandwiched between facing members which are connected by torque links to facing members of adjacent braking segments. The torque links additionally provide splined engagement with an associated part of the brake or clutch for transmitting torque to and from the braking segments.

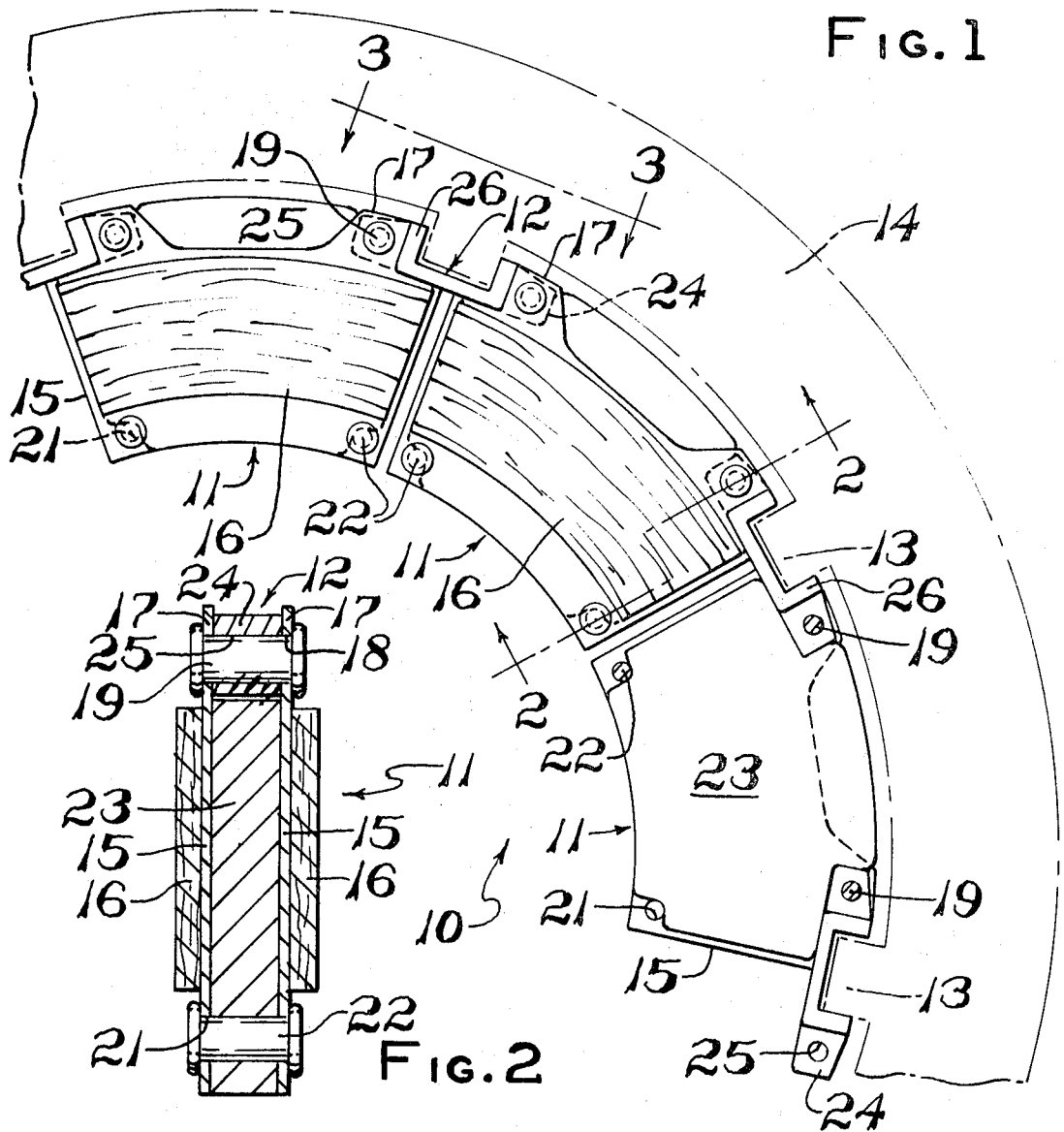
FIG. 1
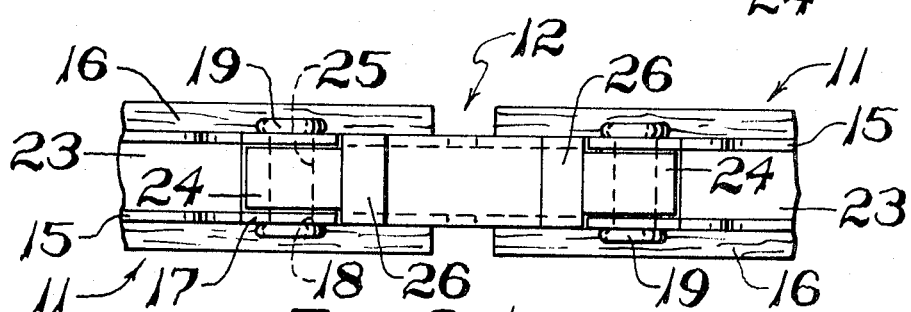
FIG. 2
FIG. 3
INVENTORS
RALPH R. MAIN
WILLIAM EDWIN ELY
BY John D. Haney
ATTY.

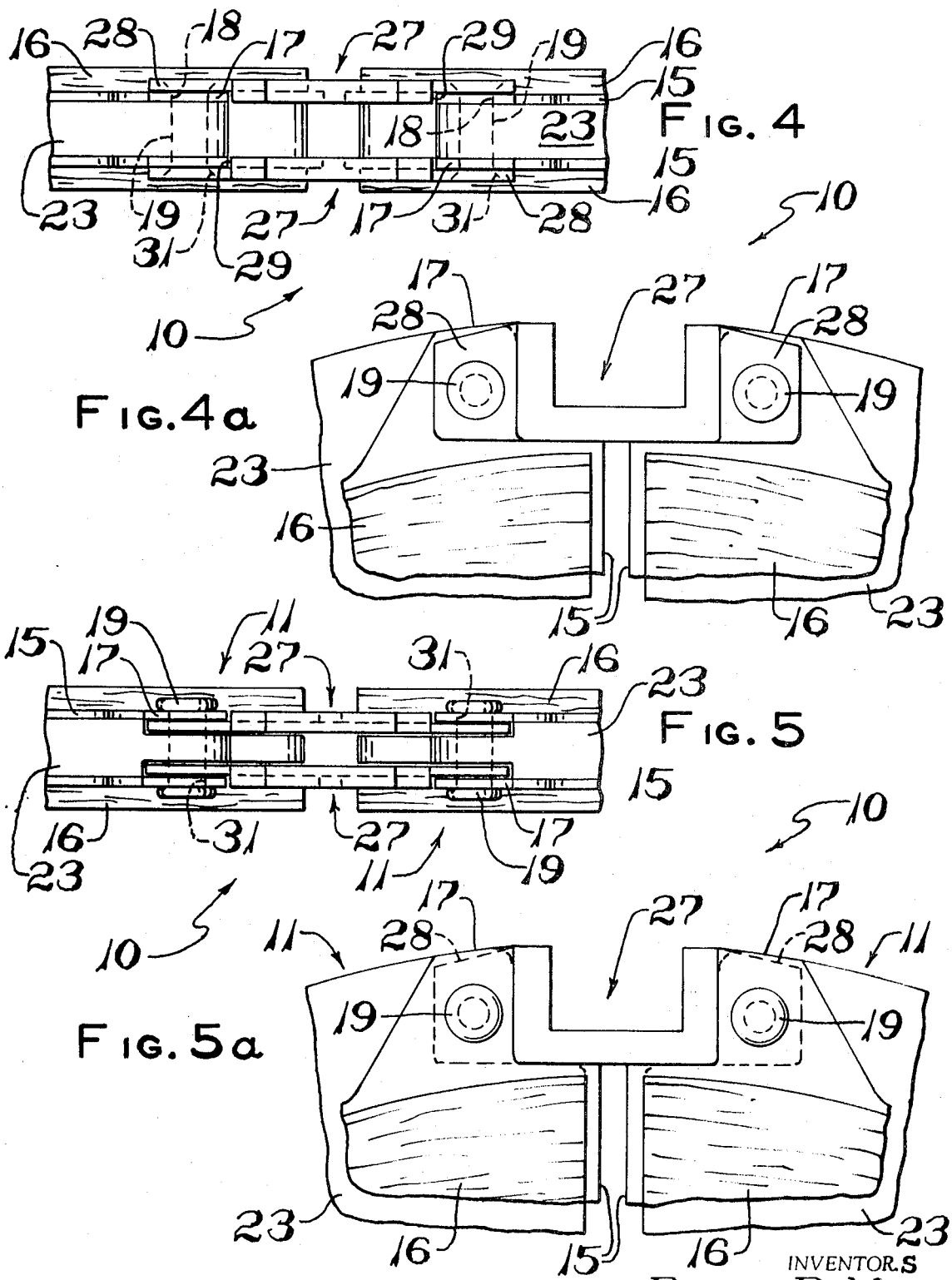

SEGMENTED FRICTION MEMBER FOR BRAKE OR CLUTCH

BACKGROUND OF THE INVENTION

This invention relates to disc-style brakes or clutches and particularly to the annular friction disc members which engage other friction disc members during operation of a brake or clutch. In high energy brakes such as those used, for example, in aircraft these friction disc members are referred to as the "heat sink elements" since they must absorb great quantities of heat during the braking operation. These friction disc members may carry a friction lining or may have surfaces which engage the friction lining of another disc member. They may also be rotors and rotate with a wheel or be stators in nonrotating engagement with a torque tube attached to the wheel support.

When solid annular brake discs are used there are serious problems with thermal warpage and cracking and therefore endeavors have been made to design segmented friction components in which the stresses causing cracking are reduced and the freedom of movement of the segments accommodates thermal warpage.

It has also been found that certain materials have greater heat-absorbing capacity at a lower overall weight than others and it is desirable to use the heat-absorbing material which is best for the specific application. For example, in a high-energy aircraft-type brake, the heat generated is of a magnitude which may call for the use of a so-called heat sink material such as beryllium which is uniquely suited for this purpose since it has unusually better heat-absorbing properties than steel or similar materials for a part of the same size. This material is quite expensive, however, and it is desirable to have a segmented friction disc member in which not only beryllium but also other suitable materials which are not as costly can be used. It should be noted that some of these heat-absorbing materials have structural weaknesses and are highly frangible. Another problem, therefore, is to make use of the heat-absorbing materials while at the same time provide a structure which will protect the heat sink material from the high torque, wear and shock which are imposed upon the friction disc members during operation.

In one form of segmented brake or clutch almost complete freedom of movement of the respective segment components may be obtained by interconnecting the segments solely by loose fitting keys projecting from one segment to the next. These assemblies satisfactorily avoid the thermal warpage problem but are quite inconvenient for field use because they ordinarily have no structural rigidity and consequently are very difficult to assemble and service. Other forms of segmented disc assemblies have key-connected segmented discs or have the disc segments mounted on annular frames of so-called "spiders" which have an inherent lack of dimensional uniformity from one driving lug to another in the assemblies. The driving lugs in these assemblies ordinarily warp under thermal loads and tend to bind on the adjoining splined parts and interfere with the proper operation of the brake or clutch.

SUMMARY OF THE INVENTION

An improved segmented friction member according to this invention includes the basic features described and claimed in the assignee's earlier filed U.S. Pat. application, now U.S. Pat. No. 3,550,740, in the respect that a series of individual segments are connected one to another by torque link members which are ordinarily outside the high temperature zones swept during the engagement of the friction members. These links serve the dual functions of providing driving engagement with the associated parts of the mechanism such as the wheel and adequate dimensional stability to avoid binding on the wheel or other associated parts.

The friction members of this invention are characterized, however, in that each segment is a composite structure including a body of a high heat capacity material with facing members which may also carry friction lining material for frictional engagement with other brake or clutch members. These facing members are preferably of steel or other wear resistant material and are connected directly to the torque link members as by rivets. The facing members enclose opposite sides of the body which may be a plate made up of beryllium or other material with a high heat capacity. The facing members are held together at the outer periphery by the rivets connecting the facing members to the torque link and by rivets at other locations extending through holes in the facing members. The body or "heat sink" fits within the facing members and is recessed to accommodate the foregoing rivets.

By connecting the facing members directly to the torque link, practically all of the wear and stress imposed by the forces on the brake are carried by the facing members and the heat sink body need not have the structural strength properties which would otherwise be required. This also provides a brake or clutch construction in which heat sink materials of different characteristics may be used depending upon the operational demands and requirements.

It is also possible with this design to accommodate even greater quantities of heat sink material by using a double torque link instead of a single torque link. This permits extending the plate of heat sink materials between the double torque links in space which would otherwise be occupied by the single torque link. There is also a savings in weight by using double links and greater control of the facing member drive edge is obtained with a double-link design in which the links overlap the outer surfaces of the facing members.

The accompanying drawings show preferred friction members made in accordance with an embodying this invention and which are representative of how this invention may be practiced.

BRIEF DESCRIPTION OF THE DRAWING

In the drawings:

FIG. 1 is a side view of a part of an annular disc assembly (shown in solid lines), certain parts being broken away, and illustrated in torque-driving engagement with a related part which in this example may be a rotatable wheel, the sides of which are represented by the chain-dotted lines;

FIGS. 2 and 3 are detailed views of the disc assembly taken along the line 2—2 and 3—3 of FIG. 1;

FIGS. 4 and 4a show a modification of the invention and especially a torque link with a double link instead of a single link; FIG. 4a being a side view of the link structure looking in a direction axially of the disc assembly; and FIG. 4 being a top view of FIG. 4a or, i.e. a view looking radially at the outer periphery of disc structure;

FIGS. 5 and 5a show a further modification in which a double-link structure is used, these figures corresponding to FIGS. 4 and 4a, respectively.

DETAILED DESCRIPTION

Referring to FIG. 1, friction disc assembly 10 includes a series of arcuate sector-shaped segments 11 of identical size and shape which are interconnected one to another at their radially outer corners by torque links 12. The torque links are in driving engagement with mating interfitting driving pieces such as lugs 13 on an associated brake or clutch member which is represented in chain-dotted lines and which in this example may be wheel rim 14. The disc assembly 10 is used as a rotor in this example but it may be used if desired as a stator as will be evident to those skilled in the art.

Facing members such as face sheets 15 may be arcuate, sector-shaped and spaced apart in parallel disposition as shown in FIG. 2. These face sheets 15 may be of steel or other wear-resistant material and may, as shown in this embodiment, carry friction lining material 16 which may be of the type described and set forth in U.S. Pat. No. 2,966,737 of R. E. Spokes et al.

At the radially outer periphery of each of the face sheets 15 are lugs 17 extending radially outward and spaced from the radial edges of the face sheets. Holes 18 are provided in the lugs 17 to accommodate rivets 19 connecting the two face sheets at the outer peripheral edge. Holes 21 in close proximity to the inner peripheral edge of the face sheets 15 are also provided to accommodate rivets 22 connecting the opposing face sheets.

Interposed between the face sheets 15 is a heat sink body of heat-absorbing material such as plate 23. In a high energy brake such as is used for aircraft this plate 23 may be of beryllium or in a brake or clutch in which the heat capacity requirement is not as great, this plate could be of carbon, steel or any other heat-absorbing material which absorbs a sufficient amount of heat generated during operation of the brake.

The torque link 12 is in the shape of a channel so as to engage the lug 13 of the wheel rim 14 and has tongues 24 extending between the lugs 17 of the face sheets 15. Holes 25 in the tongues 24 are in alignment with the holes 18 in the lugs 17 to accommodate the rivets 19. Tongue 24 may be rabbeted to a depth which will be equal to or greater than the thickness of the face sheets 15.

Projecting edges 26 of the channel-shaped links 12 produced by rabbeting the tongues 24 are substantially flush with edges of the lugs 17. Although the particular details are not shown in the drawings, appropriate clearances are provided between the edges of the face sheet lugs 17 and the edges 26 of the links 12 as well as between the inner peripheral edges of the tongues 24 and the edges of the face sheets 15 to permit relative rocking motion between the face sheets and the torque links. The torque link edges 26 may be fastened tightly against the edges of the lugs 17 and the face sheets upon initial assembly so that there will be structural rigidity for handling and assembly purposes; however, the connection is such that there is no restraint against such limited rocking motion as may occur from thermal distortion of the segments 11.

As can be seen from FIG. 1 in which one segment 11 is shown with one of the face sheets 15 removed the plate 23 is recessed at the inner peripheral edge to fit between the rivets 22 fastened to the face sheets 15. At the outer peripheral edge, the plate 23 extends radially outward between the lugs 17 to provide the maximum amount of heat sink material in this space.

In FIG. 4 and 4a there is shown a modification in which there are double torque links 27. Each of these torque links 27 is U-shaped with a connecting flange 28 extending outwardly and overlapping one of the lugs 17 of the face sheets 15. The flange 28 is rabbeted to a depth equal to or less than the thickness of one of the face sheets 15 and also to provide an edge 29 of the link for engaging the edge of the face sheet lug. Holes 31 in the flanges 28 are in alignment with the holes 18 in the lugs 17 for accommodating the rivets 19 and providing the articulated connections between the face sheets 15 and the torque links 27.

In this modification shown in FIG. 4 and 4a the plate 23 may extend between the links 27 in the space which as occupied by the torque 24 of the torque link 12 in the embodiment shown in FIG. 3. A suitable hole in the plate 23 or other recess may be provided through which the rivets 19 may pass. With the double torque links 27 there is a savings in weight of the links and an increase in space for the plate 23 as compared to a single-link construction. Also with the link flanges 28 disposed in overlapping relationship to the face sheets 15, there is good control of the face sheet.

In FIG. 5 and 5a another double-link arrangement is shown in which the torque link flange 28 is overlapped by the face sheet lugs 17 and the portion of the plate 23 between the torque link flanges is accordingly somewhat thinner than in the FIG. 4 modification.

The torque links 12 or 27 together with the face sheet lugs 17 to which they are attached are located outside of the so-called swept area of the disc assembly 10 which is the area of the assembly on which the friction linings 16 are attached and which come into frictional pressure engagement with the opposing annular braking members when the brake is engaged.

Accordingly, in operation the connections between the torque links and face sheets are in a zone of the disc assembly 10 which is normally much cooler than the section which is in the swept area.

The disc assembly 10 described herein may be modified in an obvious manner so that the lugs 17 may be provided at the inner peripheral edge of the adjoining segments 11 and the torque links 12 or 27 can be installed near the inner periphery of the assembly to engage an associated member having mating lugs directed radially inward of the assembly.

The holes 18 in the lugs 17 of the face sheets 15 and the holes 25 in the tongues 24 of the torque links 12 as well as the holes 31 in the flanges of the links 27 through which the rivets 19 are assembled to connect the links and face sheets preferably have radial clearance with the rivet 19 and such holes may be slotted in an arcuate direction or in other ways as desired in accordance with the well-known practice in the art of accommodating thermal distortion at a rivet connection.

The arcuate distance or "pitch" between the drive channels in the successive torque links 12 or 27 will remain substantially constant notwithstanding extreme thermal distortion of the segments 11 themselves during periods when they are frictionally engaged with the associated brake or clutch members. This thermal distortion will be at a minimum because of the materials and thickness of the face sheets 15; however, should the torque be sufficient to deform the face sheets 15, then the plate 23 will contact the torque links 12 or 27 to take out part of the developed torque.

We, therefore, particularly point out and distinctly claim as our invention:

1. A segmented annular friction member for a brake or clutch having a series of annularly disposed friction segments connected one to another at one of their peripheral edges by separate torque link members spaced from the heat generating friction faces of the segments and engageable with the associated brake or clutch structure so that such torque link members transfer torque between such structure and each said segment, and characterized in that one or more of the friction segments consists of an assembly having:
   a. a pair of laterally spaced friction facing plates with opposing mating lugs at one peripheral edge and adjacent radially extending edges on the torque link members and to which are connected the ends of said torque link members interconnecting the friction segment assembly to the adjoining segmented friction members; and
   b. a center plate located between and laterally engaged by said facing plates, said center plate being substantially coextensive in area with the facing plates, and being of heat-absorbing material to provide the prime heat sink portion of the friction member; and
   c. a first fastener projecting between said facing plates at a location remote from said torque link members and engageable with said center plate; and
   d. a second fastener connecting each of said opposing mating lugs and extending through one of said ends of said torque link members to provide the connection between said torque link members and said friction segments and for retaining said center plate between said facing plates in conjunction with said first fastener.

2. A friction member according to claim 1 and further characterized in that said center plate has an arcuate portion projecting into a region of each segment between the set of lugs on the facing plates to which one torque link is fastened to the segment and the set of lugs on the facing plates to which the other of the torque links is fastened to thereby maximize the quantity of said heat-absorbing material in each segment assembly and restrict movement of said center plate.

3. A friction member according to claim 1 and further characterized in that in said segment assembly each torque link consists of two mutually parallel link elements having the same configuration and which collectively are engageable with the associated brake or clutch structure, one link element of the torque link mating with a lug on one facing plate and the other corresponding link element mating with a lug on the other facing plate; and said second fastener extending through each such lug and through each such link element to fasten said plates and link elements into an integral assembly.

4. A friction member according to claim 3 and further characterized in that said center plate includes portions projecting into the region between said link elements of said torque links to thereby maximize the quantity of said heat-absorbing material in such segment assembly.

5. A friction member according to claim 4 and further characterized in that said center plate includes portions engaged with said second fastener which interconnects said facing plates and said pair of link elements.

* * * * *